United States Patent [19]

Sellars et al.

[11] Patent Number: 5,507,983
[45] Date of Patent: * Apr. 16, 1996

[54] MONITORING CONCENTRATION OF DOPE IN PRODUCT MANUFACTURE

[75] Inventors: Alan Sellars, South Humberside; Michael C. Quigley, Meriden, both of United Kingdom

[73] Assignee: Courtaulds Fibres (Holdings) Limited, London, United Kingdom

[ * ] Notice: The portion of the term of this patent subsequent to May 24, 2013, has been disclaimed.

[21] Appl. No.: 272,092

[22] Filed: Jul. 8, 1994

Related U.S. Application Data

[62] Division of Ser. No. 67,431, May 24, 1993, Pat. No. 5,354,524.

[51] Int. Cl.$^6$ .............................. B29C 47/92; D01F 2/02; D01F 13/02

[52] U.S. Cl. .............................. 264/38; 159/5; 264/40.1; 264/408; 264/40.6; 264/187; 264/203; 425/71; 425/135; 425/143; 425/217; 425/382.2; 425/404; 425/445

[58] Field of Search ............................ 264/37, 38, 40.1, 264/40.2, 40.6, 187, 203; 425/71, 135, 143, 144, 217, 382.2, 404, 445; 159/5

[56] References Cited

U.S. PATENT DOCUMENTS 4,416,698   11/1983   McCorsley .......................... 106/163.1

OTHER PUBLICATIONS

Patent Abstracts of Japan, vol. 5, No. 4, 13 Jan. 1981 JP A 55 132 (Nippon Ester Co. Ltd.) 15 Oct. 1980.

Primary Examiner—Leo B. Tentoni
Attorney, Agent, or Firm—Fish & Richardson

[57] ABSTRACT

Continuous elongate members such as filaments are produced by forming a hot dope of cellulose, amine oxide and water, extruding the dope through a die assembly and precipitating the cellulose to form the bodies and maintaining the concentration of the dope at a predetermined value by monitoring the refractive index of the dope before it is extruded.

34 Claims, 4 Drawing Sheets

TERNARY DIAGRAM SHOWING
CELLULOSE IN N-METHYLMORPHOLINE
N-OXIDE

VARIATION OF REFRACTIVE INDEX OF 77.5% AMINE OXIDE WITH TEMPERATURE

MONITORING CONCENTRATION OF DOPE IN PRODUCT MANUFACTURE

This is a divisional of patent application Ser. No. 08/067,431 filed on May 24, 1993, now U.S. Pat. No. 5,354,524.

BACKGROUND TO THE INVENTION

This invention relates to the monitoring of the concentration of the components of a dope used in the manufacture of cellulose fibre and other cellulose product from a solution of cellulose in an organic solvent, particularly an amine oxide solvent and water. Cellulose manufactured in this manner is known as lyocell and Will hereafter be referred to as solvent-spun cellulose or lyocell. The term "dope" as used herein refers to the solution of cellulose in an aqueous tertiary amine oxide.

BRIEF DESCRIPTION OF THE PRIOR ART

The invention particularly aims to provide a means to monitor the dope concentration before it is passed to be spun into strands which are to be further treated to form the desired filaments. The manufacture of lyocell cellulose filaments is described, for example, in U.S. Pat. No. 4,416,698 the contents of which are incorporated herein by way of reference. This Patent discloses a method of producing cellulose filaments by dissolving the cellulose in a suitable solvent such as a tertiary amine N-oxide.

A hot solution of the cellulose i.e. dope, is extruded or spun through a suitable die assembly including a jet to produce strands of the dope which are passed into water to leach out the amine oxide solvent from the extruded strands to produce the desired filamentary material.

The production of artificially formed filaments of material by extruding or spinning a solution or liquid through a spinnerette to form the filaments is, of course, well known. Initially, relatively small numbers of individual filaments were prepared, which filaments were individually wound up for use as continuous filament material. This meant that the number of continuous filaments which needed to be produced was essentially dictated by the number of filaments which could be individually wound either before or after drying.

However, if fibre is produced as a tow or if fibre is produced as a staple fibre then different criteria apply to the number of filaments which can be produced at any one time. A tow essentially comprises a bundle of essentially parallel filaments which are not handled individually. Staple fibre essentially comprises a mass of short lengths of fibre. Staple fibre can be produced by the cutting of dry tow or it can be produced by forming a tow, cutting it whilst still wet, and drying the cut mass of staple fibre.

Because there is no need to handle individual filaments in the case of a tow product or a staple product, large numbers of filaments can be produced simultaneously.

In order that the dope can be spun readily into filaments it is necessary to ensure that concentration of the three phase dope solution i.e. cellulose amine oxide and water, is constrained between predetermined limits. Thus at the beginning of the manufacturing process amine oxide, water and shredded cellulose together with a stabiliser such as propyl gallate are mixed in a pre-mixer at elevated temperature, the pre-mixed solution so obtained maybe passed through a thin film evaporator to apply conditions of increased temperature and reduced pressure so as to reduce the water content of the mixture and form a hot viscous solution or dope. The dope from the thin film evaporator is passed to the die assembly to form strands of dope which are then passed through a spin bath and then to a further water bath to leach out the amine oxide solvent. The resulting tow of filaments is then passed to further processing stages, e.g. finishing operations, drying and crimping and/or storage.

FIELD OF THE INVENTION

The amine oxide leached out of the strands is preferably recycled. Thus, to recover the amine oxide, the contents of the spin bath are passed to an evaporator to increase the amine oxide concentration to that desired for the original starting material. This amine oxide is then fed to the pre-mixer with more cellulose to start the cycle again. Moreover, the amine oxide/water from the further water bath can be passed to the spin bath.

It will be appreciated that the amine oxide/water/cellulose concentrations in the dope need to be monitored to ensure that it is of the right strength to make a good product.

It is an object, therefore, of the invention to provide monitoring means to check and to ensure that the amine oxide/water/cellulose concentration of the hot viscous dope is of the desired concentration before it passes to the die assembly. Preferably monitoring is followed by adjustment of the composition to the desired concentrations.

It is a further object of the invention to provide monitoring means to check the concentration of amine oxide drawn off from the further water bath.

It is a yet further object of the invention to provide monitoring means to check and to ensure that the concentration of amine oxide to be recycled is of the desired level for feeding back to the pre-mixer.

The invention is based on the surprising realisation that if the refractive index of the three-phase solution, i.e. cellulose, amine oxide and water, is maintained within relatively narrow predetermined limits, i.e. if the three constituents are controlled so that the refractive index of the dope stays within those limits, a good product can be obtained from the dope. If the concentration of the dope changes so that the refractive index of the dope is allowed to go outside those limits, a satisfactory product may not be obtained. The reasons for this are not fully understood and it is indeed surprising that concentration of a three-phase solution can be controlled in this manner.

SUMMARY OF THE INVENTION

In one aspect, therefore, the invention provides a method of monitoring the concentration of a dope of cellulose/amine oxide/water solution for use in the manufacture of continuous filaments of solvent-spun cellulose in which a hot dope is formed from a mixture of the cellulose, amine oxide and water and the dope is passed to a die assembly to be extruded into strands, in which the refractive index of the dope is measured and the concentration of the dope is adjusted if the refractive index of the dope varies from a predetermined value by more than a predetermined amount.

Preferably, the amine oxide, water and cellulose are mixed in a pro-mixer and the solution so obtained is passed through a thin film evaporator to reduce the water content to form the hot viscous dope.

In another aspect the invention provides an apparatus for the monitoring of the concentration of an amine oxide/water/cellulose dope for use in the manufacture of continuous filaments of solvent-spun cellulose, which comprises means to mix cellulose, amine oxide solvent and water to form a hot dope, means to pass the hot dope to an extruder die and monitoring means, the monitoring means comprising means to measure the refractive index of the dope before it passes to the extruder die.

The amine oxide solvent will preferably be a tertiary amine N-oxide. The source of cellulose may be of, for example, shredded paper or shredded wood pulp. A small amount of stabiliser e.g. propyl gallate, may also be included in the pre-mixer, e.g. from 0.1 to 2% by weight of the ingredients.

The refractive index monitoring means may be a manual, i.e. batch, measurement in which samples of the hot dope are extracted at time intervals and taken to an appropriate instrument for measurement or the means may be a continuous measuring means installed in the production line. A suitable instrument for in-line measurement is, for example, a Process Refractomer type PR-01 supplied by K-Patents.

It will be appreciated that the refractive index of the dope varies with temperature. It is, therefore, necessary to take temperature into account and, in the batch-testing process, it is preferred that the measurement be carried out at 60° C. Thus the hot sample is allowed to cool to that temperature before the measurement is taken. If in-line monitoring is carried out, then it is necessary that the monitoring means also measures the temperature of the dope and the refractive index measuring means is calibrated to compensate for temperature.

We have found that dope solutions whose refractive index at 60° C. lies in the range 1.4895±0.0005, i.e. 1.4890 to 1.4900 are satisfactory for use and result in satisfactory products.

As indicated above, in the manufacture of solvent-spun cellulose filaments, amine oxide leached out of the strands may be recycled and, after any necessary concentration adjustment, used to dissolve more cellulose. Moreover, the hot strands emerging from the extruder die are passed through a spin bath in which a mixture of water and cellulose is recirculated and partial leaching out of the amine oxide from the strands commences. From the spin bath the strands then pass to the water bath where the leaching out process is completed. Amine oxide from the water bath may, therefore, be circulated to the spin bath.

In another aspect of the invention, therefore, the amine oxide drawn off from the water bath is passed through an in-line monitoring station where its concentration is continuously monitored as it is passed to the spin bath.

In yet another aspect of the invention, amine oxide is drawn off from the spin bath and its concentration, i.e. water content, is adjusted to the level required for re-use in the initial pre-mixing stage to dissolve more cellulose and the amine oxide of adjusted concentration is passed through an in-line monitoring station where its adjusted concentration is continuously monitored.

BRIEF DESCRIPTION OF THE DRAWINGS

Specific embodiments of the invention will now be further described by way of example only with reference to the accompanying drawings in which.

Figure 1:
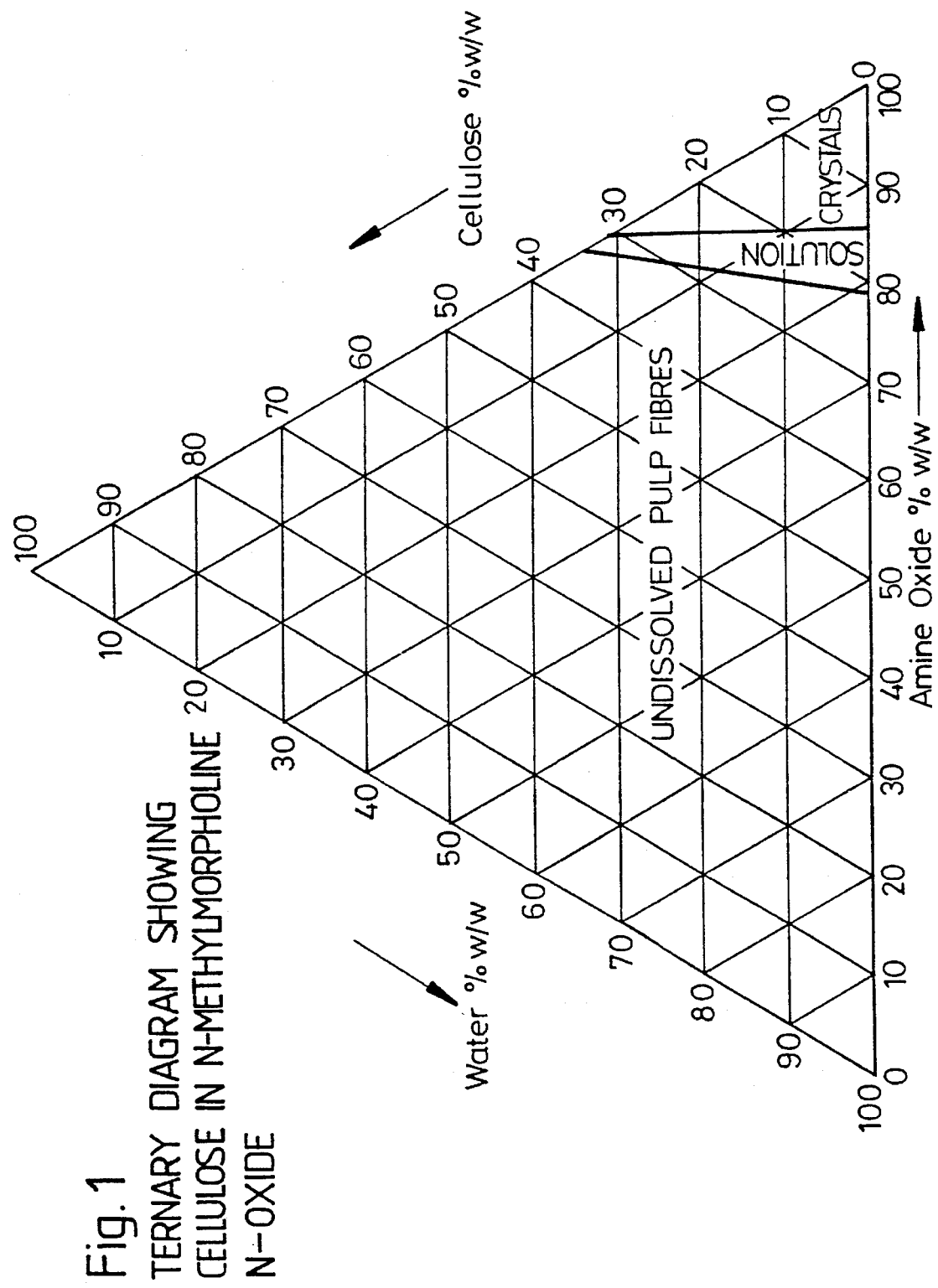
FIG. 1 is a ternary diagram showing cellulose in N-methylmorpholine N-oxide and water.

The ternary diagram of FIG. 1 shows clearly that for cellulose to be in solution in an amine oxide:water phase, the proportions of the three ingredients must be kept within closely-defined and narrow concentration ranges.

Figure 2:
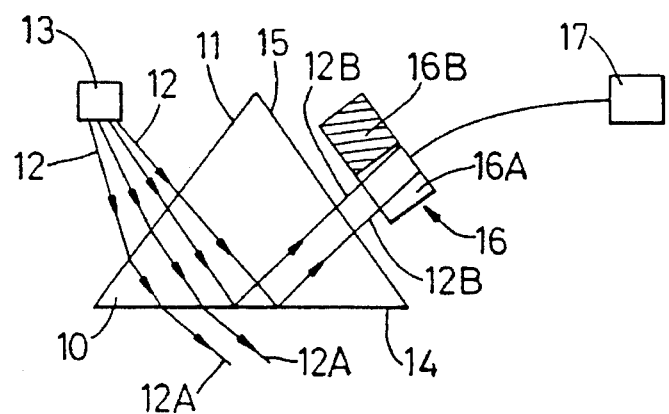
FIG. 2 is a diagrammatic illustration of the refractive index measurement means.

In FIG. 2, the basic principle of the refractive index measurement is illustrated. A prism 10 whose face 11 is wetted by the solution whose concentration is to be measure is subjected to a beam of light rays 12 from a source 13, the rays being at a multiplicity of angles to the surface 11. Some of the rays 12A will be refracted and pass through face 14 of the prism. Others 12B of the rays will be reflected and pass through face 15 of the prism to impinge on receiver 16. Part 16A of the receiver will be in shadow, receiving no light rays, and part 16B receiving light rays 12B. The position of the boundary between parts 16A and 16B will be determined by the concentration of any particular solution. Thus the refractive index measuring device can be pre-calibrated using solutions of known concentration. By means of photocell sensors in the receiver 16, the boundary between the shadow region and the remainder can be monitored and using a pre-programmed microprocessor or chip 17, any variations of concentration beyond predetermined and pre-set values will trigger a response, which can activate compensating means automatically or manually, as desired, to correct the concentration deficiency.

Figure 3:
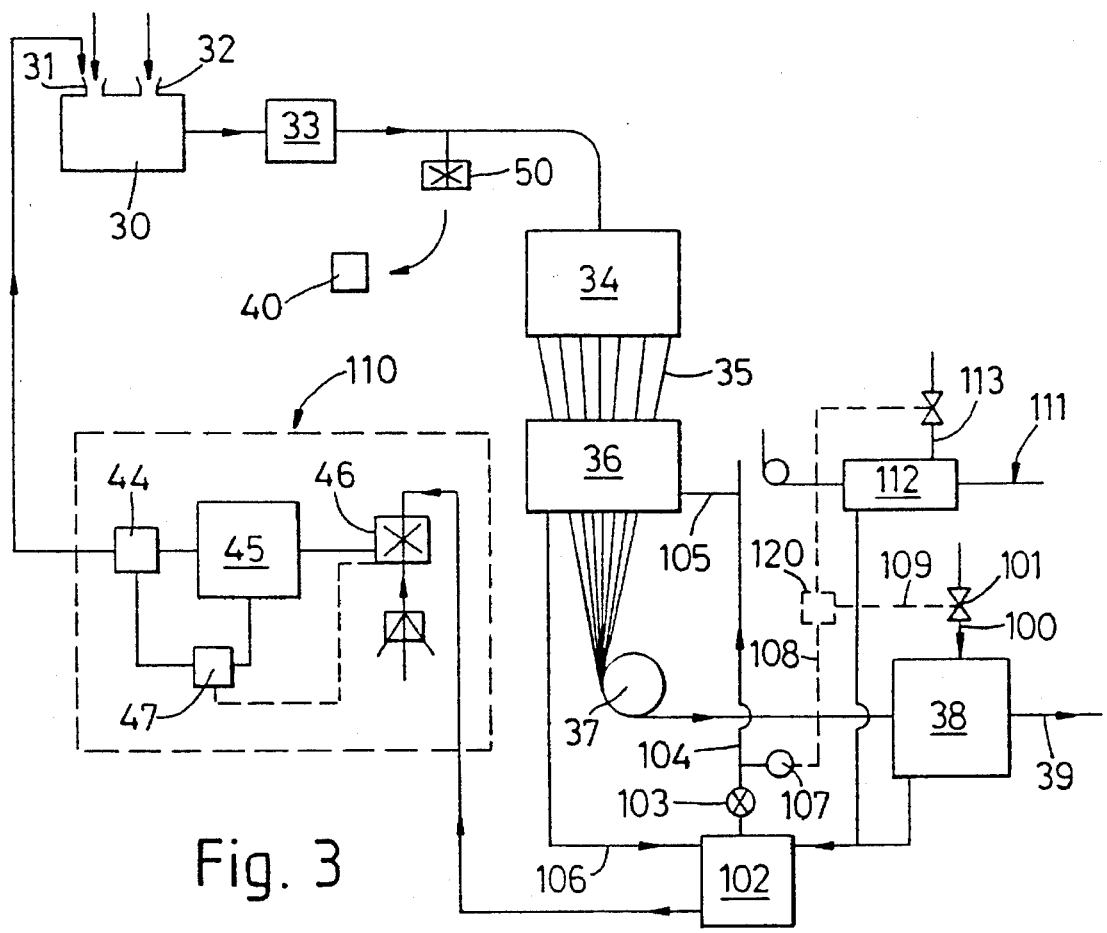
FIG. 3 is a diagrammatic representation of the various stages in the manufacture of a continuous tow of solvent-spun cellulose fibres, i.e. lyocell.

In FIG. 3, amine oxide and water are introduced into pre-mixer 30 via inlet 31 and shredded cellulose, stabiliser and water are introduced into the pre-mixer via inlet 32. The mixture so formed is passed through a thin film evaporator 33 where the water concentration is reduced and a hot dope is produced. For example, a 78/22 w/w amine oxide/water mixture and a 94/6 w/w cellulose/water mixture may be introduced into the pre-mixer in proportions to give a 13/19/68 w/w cellulose/water/amine oxide mixture. That mixture is passed to a thin film evaporator 33 where mixture is heated and evaporated and the water content is reduced so that the solution (dope) formed therein there is 15/9/76 w/w cellulose/water/amine oxide.

From the the film evaporator 33 the hot dope solution is passed to spinnerette 34 where it is spun into continuous strands 35 of fibres. As the hot strands 35 emerge from spinnerette 34, they pass through an air gap and into a spin bath 36 in which a mixture of water and amine oxide is recirculated. At the start up there may be no amine oxide in the spin bath but its proportion to water may rise to about 25% by weight. From spin bath 36 the strands pass via roll 17 through a wash bath 38. The strands passing through the wash bath may be, for example, up to 12 to 14 inches wide. In the wash bath 38 the amine oxide not leach out in the spin bath 36 is washed out of the strands and the tow 39 emerging from the water bath is of solvent-spun cellulose, i.e. lyocell.

From the wash bath 38, the tow is passed for finishing operations, e.g. through a bath to add finishing chemicals to the fibre, through a drier and to crimping and/or storage and/or cutting means to reduce the filaments to staple fibre lengths.

To ensure that the cellulose/water/amine oxide dope solution passing from the thin film evaporator 33 to the spinnerette 34 is of the required concentration, valve 39 is provided between the evaporator and spinnerette so that samples of the solution can be drawn off for testing. 100 g (3.5 ounces) samples are withdrawn at suitable time intervals. The dope is a hot and very viscous solution at this stage (e.g. it may have a viscosity of 1 to 5000 Pascal seconds at 105° C.) and it is found convenient to wrap the samples in polyester film to transport them to a refractive index measuring station indicated at 40 in FIG. 3. A 5 g (0.18 ounce) 1 mm (0.04 inch) thick portion of the 100 g sample is placed in the refractive index measuring instrument 140, which is maintained at 60° C. After two minutes to allow the sample temperature to reach 60° C. its refractive index is measured. The instrument is pre-calibrated as described above. For the 15/9/76 cellulose/water/amine oxide solution, the refractive index measurement should be 1.4895. At a value of 1.4860 a significant proportion of the cellulose fibres are out of solution and at a value of 1.4930 crystallisation is taking place. Thus, as indicated above, limits of 1.4890 to 1.4900 can be set as acceptable. Any reading outside these limits means that the feed to the pro-mixer and/or the evaporator conditions requires adjustment.

During start up of the manufacturing process it may be necessary to take refractive index readings of the hot dope once every 1 to 10 minutes but during normal operating conditions a measurement once every hour or up to 2 hours may be found to be satisfactory. Of course, if problems, e.g. with the feed materials, are being experienced, it will be necessary to increase the frequency of monitoring.

The manufacturing process illustrated in FIG. 3 also includes two in-line refractive index monitoring stations.

Water is fed to the wash bath 38 via a line 100 and a valve 101. From the bath 38 the water with some amine oxide in it is passed to a circulation tank 102. The water-amine oxide in tank 102 is then pumped by pump 103 into line 104. The water/amine oxide then passes to spin bath 36 via line 105. Excess water and amine oxide from spin bath 36 is recycled into tank 102 via line 106. A refractive index meter 107 monitors the water/amine oxide ratio in the line 104 and as the concentration of amine oxide in the line increases, the valve 101 is opened further (via connection 108, 109) to increase the water flow and reduce the amine oxide concentration.

Excess liquid in tank 102 is passed to solvent recovery at 110.

If required more than one line producing fibre—e.g. line 111 can feed into tank 102. Only the wash tank 112 and water line 113 of the line 111 is shown, but it is otherwise the same as 34–39.

The refractive index monitor at 107 monitors the amine oxide/water concentration passing from tank 102 to the spin bath 36. Again, the device 107 is pre-calibrated using suitable concentrations of amine oxide/water solutions and for a solution passing to the spin bath an amine oxide/water ratio of, say, 25:75 w/w could preferably be maintained. The refractive index of such a solution should be 1.3676 at 60° C. The refractive index measuring device is connected to a microprocessor unit 120. This can be pre-set such that any refractive index measurement outside the range of, say, 1.3644 to 1.3708 at 60° C. triggers an adjustment to the valves such as valve 101 supplying water to water bath 38. By this means the water/amine oxide concentration can be adjusted appropriately and automatically.

Figure 4:
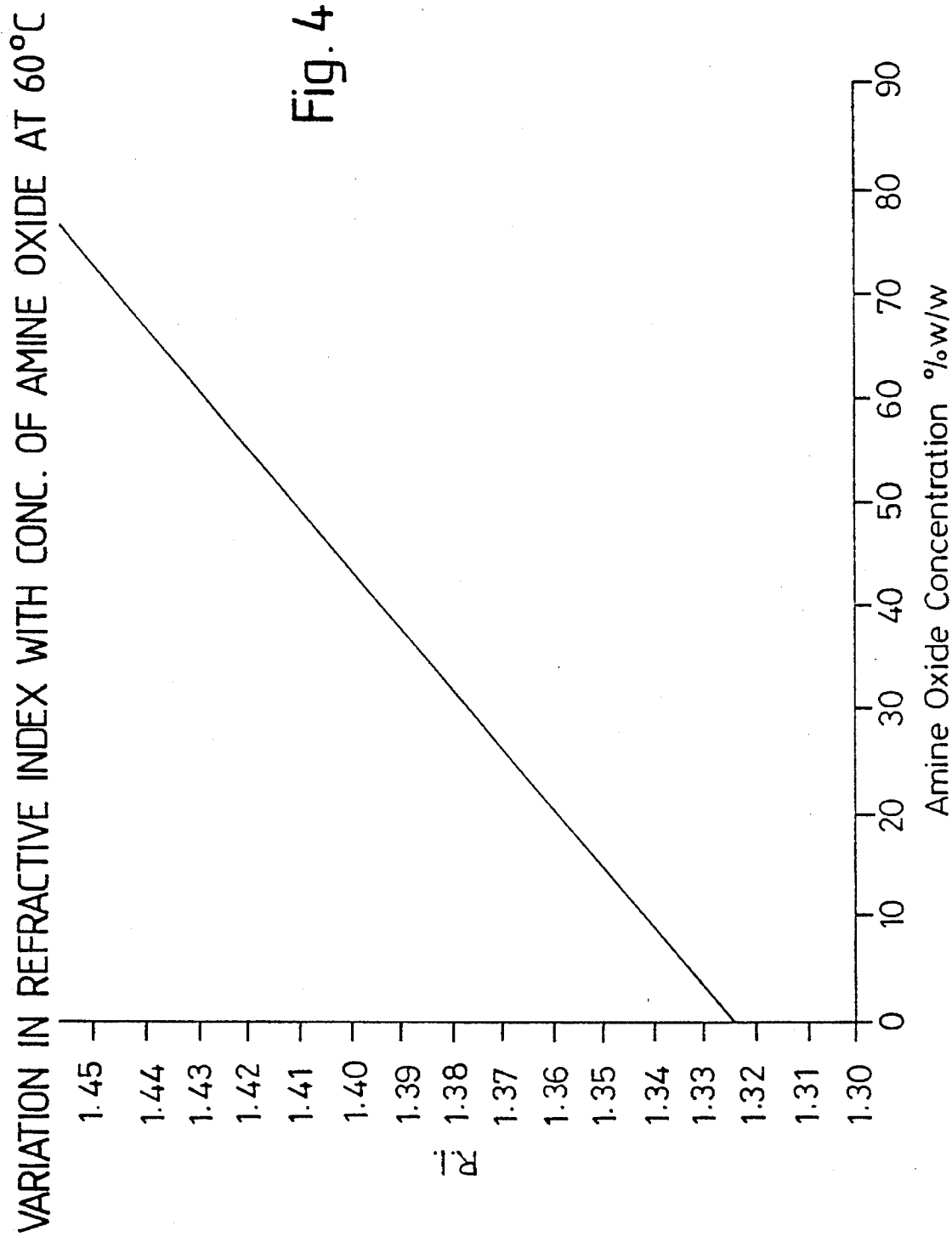
FIG. 4 is a graph showing the variation with concentration of refractive index of solutions of amine oxide and water at 60° C.

FIG. 4 shows the linear change in refractive index with changing amine oxide concentration an 60° C. (It will be appreciated that a similar graph for the dope solution would be a 3-dimensional graph.).

Figure 5:
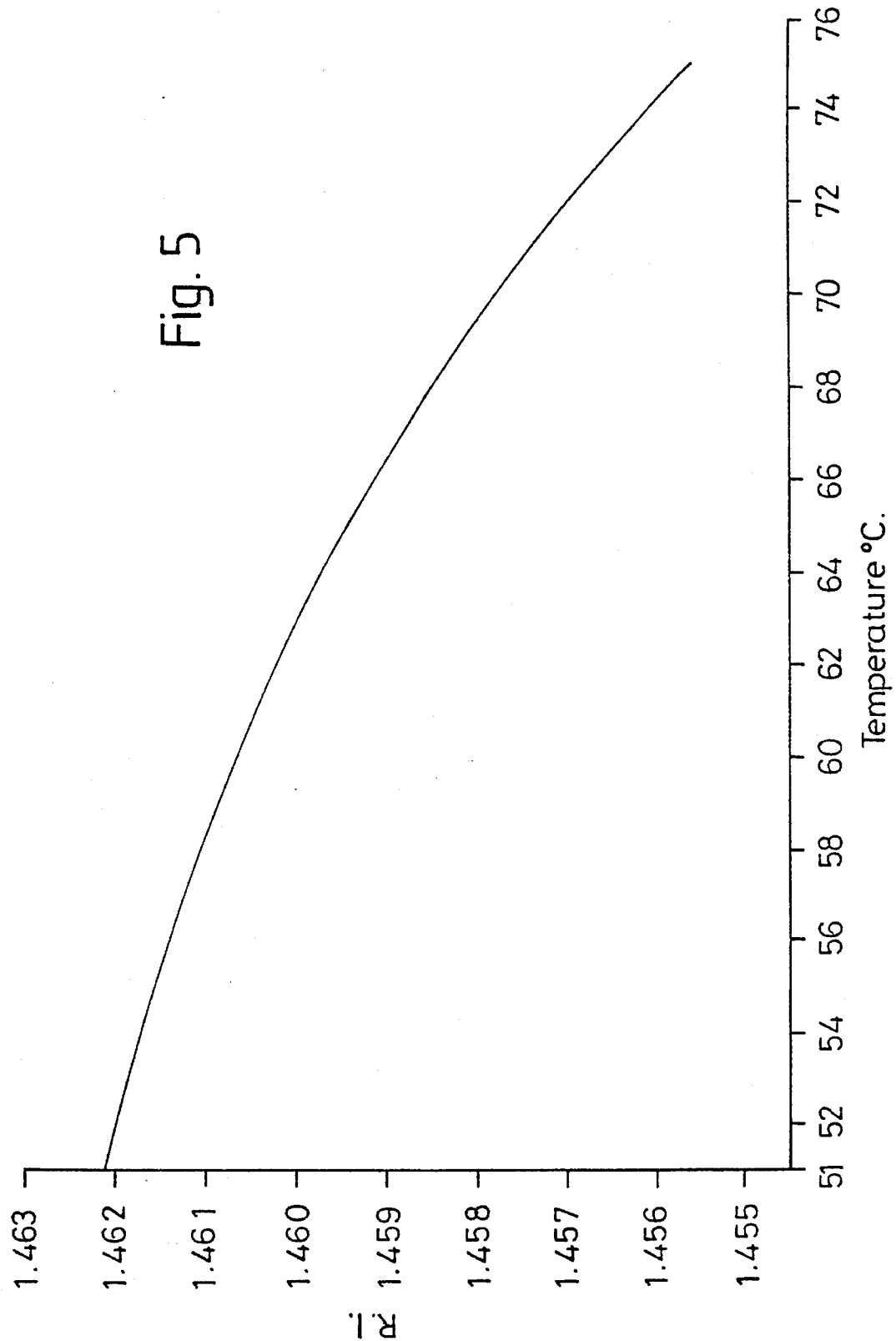
FIG. 5 shows the variation with temperature of refractive index of a 77.5% amine oxide, 22.5% water solution.

It will be appreciated that the temperature of the amine oxide/water solution passing to the spin bath will not be at the 60° C. temperature at which the aforementioned dope refractive index measurements were carried out. A temperature compensation system must be used in calibrating the refractive index measurement for in-line operation. FIG. 5 shows the Refractive Index:temperature relationship for a typical amine oxide/water (77.5/22.5 w/w) solution. Similar graphs can readily be plotted and the appropriate calibration carried out for any desired concentrations. The monitoring station 41, therefore, also measures the temperature of the amine oxide/water so that the correct calibration range is used by the instrument.

The second in-line monitoring station is shown at 44 in FIG. 3.

The amine oxide/water solution taken from tank 102 passes valve 46 where more amine oxide may be added, if needed, and then through evaporator 45, which may be a conventional three stage evaporator, where the concentration of the amine oxide to water is increased to the desired level for re-use of the amine oxide, i.e. to 78/22 w/w in our above example. From the evaporator 45, the amine oxide/water passes monitoring station 44 where its refractive index is continuously monitored in the same manner as described with reference to station 41 above. The refractive index measurement for a 78/22 solution, when temperature compensated, as described above, should be 1.4624 at 60° C. If the value falls outside the range 1.4620 to 1.4628, the microprocessor 47, to which the refractive index measuring station is connected can operate valve 46 to admit additional amine oxide or can control the evaporator 45 conditions accordingly.

It will be appreciated that various embodiments can be changed without departing from the scope and spirit of the invention.

In particular, the desired amine oxide/water/cellulose proportions at the various stages of the process may be varied to meet differing manufacturing conditions and end-product specifications.

Moreover, if desired, more than one manufacturing line may share an in-line monitoring station with appropriate controls to determine which line at any time may require adjustment.

We claim:

1. A method for the production of elongated cellulosic bodies which comprises forming a dope, said dope being a hot solution of cellulose, amine oxide and water, extruding the dope through a die assembly to form said bodies, and precipitating the cellulose in the formed bodies; and including the steps of measuring the refractive index of the dope before it is extruded and adjusting the concentration of the dope when said refractive index varies from a desired predetermined value by more than a predetermined amount.

2. A method according to claim 1, in which the concentration of the dope is adjusted when the refractive index falls outside the range 1.4895±0.0005 at 60° C.

3. A method according to claim 1, in which the refractive index measurement is a batch measurement carried out on samples of the hot dope prior to its being extruded through the die assembly.

4. A method according to claim 1, in which the cellulose, amine oxide and water are pre-mixed, the mixture is passed through a thin film evaporator to reduce its water content to form the desired dope and the refractive index measurement is carried out on the dope sampled between the evaporator and the die assembly.

5. A method according to claim 3, in which the samples of hot dope are wrapped in polyester film and so wrapped are transported to a refractive index measuring means.

6. A method according to claim 3, in which the refractive index measurement is conducted at about 60° C. and each sample is allowed to reach that temperature before the measurement is taken.

7. A method according to claim 1, in which the refractive index is monitored continuously by an in-line instrument.

8. An apparatus for the production of elongated cellulosic bodies comprising, in combination, means for forming a hot dope of cellulose, water and amine oxide, means for extruding said dope through a die assembly to form said elongated bodies, and means for measuring the refractive index of said dope before extrusion.

9. The apparatus according to claim 8, wherein said means for forming a dope comprises means for forming a mixture of cellulose, water and amine oxide and a thin film evaporator to apply conditions of heat and reduced pressure to said mixture, whereby the water content of the mixture can be reduced to form the desired dope.

10. The apparatus according to claim 9, in which the means to measure the refractive index is a batch means and includes means to draw off samples of the hot dope between the thin film evaporator and the die assembly.

11. An apparatus according to claim 9, in which the means to measure the refractive index is calibrated to take the measurement at about 60° C.

12. An apparatus according to claim 8, in which the means for measuring the refractive index is calibrated to indicate any measurement outside the range 1.4895±0.0005.

13. An apparatus according to claim 8, in which the means for measuring the refractive index comprises in-line means for continuous measuring.

14. An apparatus according to claim 13, in which the means to measure the refractive index comprises means to measure the temperature of the solution and is calibrated to compensate refractive index values for temperature variations.

15. An apparatus according to claim 13, in which the means to measure the refractive index is coupled to a microprocessor which is programmed to trigger an adjustment to the water concentration of the dope when the refractive index value falls outside a predetermined range.

16. A method of making elongated cellulosic bodies in which:

cellulose is dissolved in an amine oxide solvent and water to form a hot dope, the hot dope is extruded through a die assembly to form continuous elongated bodies, the elongated bodies are passed through a spin bath containing water and amine oxide in which a portion of the amine oxide in the body is leached into the spin bath, the bodies are then passed through a water bath in which the remainder of the amine oxide is leached out of the bodies, amine oxide is recycled from the water bath to the spin bath, and the concentration of the amine oxide/water solution passing from the water bath to the spin bath is monitored, said monitoring comprising taking refractive index measurements of the solution and adjusting the concentration of the solution when its refractive index varies from a predetermined value by more than a predetermined amount.

17. A method according to claim 16, in which the refractive index of the solution is monitored continuously by an in-line instrument.

18. A method according to claim 17, in which the monitoring also includes measuring the temperature of the amine oxide/water solution and compensating the refractive index value for temperature variations.

19. A method according to claim 16, in which amine oxide from the spin bath is recycled and used to dissolve more cellulose.

20. A method according to claim 19, in which the amine oxide/water solution from the spin bath is passed through an evaporator to reduce its water content and is then passed through an in-line monitoring station where its refractive index is monitored, and its concentration adjusted, when the refractive index varies from the predetermined value by more than a predetermined amount, before it is used to dissolve more cellulose.

21. A method for the manufacture of elongated cellulosic bodies in which:

cellulose is dissolved in an amine oxide solvent and water to form a hot dope;

the hot dope is extruded through a die assembly to form an elongated cellulosic body;

the body is passed through a spin bath containing water and amine oxide in which a portion of the amine oxide in the body is leached into the spin bath;

the body is then passed through a water bath in which the remainder of the amine oxide in the body is leached out, amine oxide from the spin bath is recycled and used to dissolve more cellulose; and the concentration of the amine oxide/water solution passing from the spin bath to be recycled is monitored, the monitoring comprising taking refractive index measurements of the solution and adjusting the concentration of the solution when its refractive index varies from a predetermined value by more than a predetermined amount.

22. A method according to claim 21, in which the refractive index of the solution is monitored continuously by an in-line instrument.

23. A method according to claim 22, in which the monitoring also includes measuring the temperature of the amine oxide/water solution and compensating refractive index value for temperature variations.

24. A method according to claim 22, in which the amine oxide/water solution is passed through an evaporator to reduce its water content before it is passed to the in-line monitoring instrument.

25. A method according to claim 21, in which amine oxide from the water bath is recycled to the spin bath.

26. An apparatus for the manufacture of elongated cellulosic bodies which comprises:

means to form a mixture of cellulose, an amine oxide and water, means to form a hot dope from the mixture of cellulose, an amine oxide solvent and water;

means to pass the hot dope to an extruder die to form elongated bodies from the hot dope;

a spin bath containing water and amine oxide through which the bodies can be passed;

a water bath through which the strands from the spin bath can be passed to leach the amine oxide from the bodies;

means to pass an amine oxide/water solution from the spin bath to the means to form a mixture of cellulose, amine oxide and water; and means to monitor the concentration of the amine oxide/ water solution passing from the spin bath to the means to form a mixture of cellulose, amine oxide and water by measurement of its refractive index.

27. An apparatus according to claim 26, in which the means to monitor the concentration is an in-line device to monitor continuously the amine oxide/water solution.

28. An apparatus according to claim 27, in which the monitoring means also measures the temperature of the amine oxide/water solution and is calibrated to compensate the refractive index values for temperature variations.

29. An apparatus according to claim 27, in which the monitoring means is coupled to a microprocessor which is programmed to trigger a means to adjust the amine oxide/ water concentration if the refractive index value falls outside a predetermined range.

30. An apparatus according to claim 29, which includes an evaporator through which the amine oxide/water solution from the spin bath is passed and the means to adjust the amine oxide concentration comprises means to adjust the conditions in the evaporator.

31. An apparatus according to claim 29, in which the means to adjust the amine oxide concentration comprises means to add more amine oxide to the solution.

32. An apparatus according to claim 29, in which the amine oxide/water concentration is about 78/22 w/w and the predetermined range of refractive index is from 1.4620 to 1.4628 at 60° C.

33. An apparatus according to claim 26, which additionally comprises means to recycle amine oxide from the water bath to the spin bath.

34. An apparatus according to claim 33, which includes in-line means to monitor the concentration of the amine oxide/water solution passing from the water bath to the spin bath.

* * * * *

UNITED STATES PATENT AND TRADEMARK OFFICE
CERTIFICATE OF CORRECTION

PATENT NO.  : 5,507,983
DATED       : April 16, 1996
INVENTOR(S) : Alan Sellars and Michael C. Quigley It is certified that error appears in the above-identified patent and that said Letters Patent is hereby corrected as shown below:

Col. 1, line 14    Cancel "Will" and substitute --will--

Col. 2, line 61    Cancel "pro-mixer" and substitute --pre-mixer--

Col. 4, line 56    Cancel "17" and substitute --37--

Col. 5, line 20    Cancel "pro-mixer" and substitute --pre-mixer

Signed and Sealed this

Eighteenth Day of March, 1997

Attest:

BRUCE LEHMAN

Attesting Officer

Commissioner of Patents and Trademarks